(12) United States Patent
Filippo

(10) Patent No.: US 10,302,963 B2
(45) Date of Patent: May 28, 2019

(54) CONTACT LENS AND METHOD FOR THE PRODUCTION OF A CONTACT LENS

(71) Applicant: BF RESEARCH S.r.l., Rome (IT)

(72) Inventor: Alessandro Filippo, Varmo (IT)

(73) Assignee: BF RESEARCH S.R.L., Rome (IT)

( * ) Notice: Subject to any disclaimer, the term of this patent is extended or adjusted under 35 U.S.C. 154(b) by 0 days.

(21) Appl. No.: 15/538,532

(22) PCT Filed: Dec. 18, 2015

(86) PCT No.: PCT/IB2015/059773
§ 371 (c)(1),
(2) Date: Jun. 21, 2017

(87) PCT Pub. No.: WO2016/108134
PCT Pub. Date: Jul. 7, 2016

(65) Prior Publication Data
US 2017/0351115 A1    Dec. 7, 2017

(30) Foreign Application Priority Data

Dec. 29, 2014 (IT) .............................. PD2014A0366

(51) Int. Cl.
| | |
|---|---|
| *G02C 7/00* | (2006.01) |
| *G02C 7/02* | (2006.01) |
| *G02C 7/04* | (2006.01) |
| *G02C 7/16* | (2006.01) |

(52) U.S. Cl.
CPC ............. *G02C 7/044* (2013.01); *G02C 7/045* (2013.01); *G02C 7/16* (2013.01)

(58) Field of Classification Search
CPC . G02C 7/061; G02C 7/02; G02C 7/04; G02C 7/042; G02C 7/046; G02C 7/10; A61F 2/1613
USPC .............. 351/159.06, 159.01, 159.02, 159.1, 351/159.12, 159.14, 159.08, 159.09, 351/159.24, 159.31, 159.6, 159.64, 351/159.73, 159.74
See application file for complete search history.

(56) References Cited

U.S. PATENT DOCUMENTS

| | | |
|---|---|---|
| 6,322,213 B1 | 11/2001 | Altieri et al. |
| 2010/0053549 A1 | 3/2010 | Legerton et al. |
| 2010/0265458 A1 | 10/2010 | Nachev et al. |

FOREIGN PATENT DOCUMENTS

| | | |
|---|---|---|
| EP | 1055145 A1 | 11/2000 |
| FR | 2712397 A1 | 5/1995 |
| WO | 9941633 A1 | 8/1999 |
| WO | 2007146673 A2 | 12/2007 |

*Primary Examiner* — Dawayne Pinkney
(74) *Attorney, Agent, or Firm* — Volpe and Koenig, P.C.

(57) ABSTRACT

A contact lens (1) comprises an optical zone (5) extending with a first diameter (A) about an optical axis (X) of the lens, and is provided with a first dioptric power and a central region (6), extending about the optical axis (X) with a second diameter (B), smaller than the first diameter, inside which is provided an optically inactive zone (7) with a diameter smaller than 0.5 mm.

17 Claims, 1 Drawing Sheet

CONTACT LENS AND METHOD FOR THE PRODUCTION OF A CONTACT LENS

TECHNICAL SCOPE

The present invention relates to a contact lens having the features set out in the preamble of independent claim 1.

It also relates to a method for the production of a contact lens, in accordance with the features set out in the preamble of independent claim 11.

TECHNOLOGICAL BACKGROUND

Contact lenses are widely used around the world to correct many of the most common visual defects, such as myopia, hypermetropia or astigmatism.

Contact lenses of the multifocal type, in which the dioptric power of the lens varies according to the distance from the optical axis of the lens, are also known.

This type of lens is typically used for the correction of visual defects that affect short-distance and long-distance vision, providing zones with differentiated dioptric powers according to graduations that may assume quite complex profiles.

An example of a multifocal contact lens of the type described above is known from U.S. Pat. No. 6,322,213 in the name of Euro Lens.

However, contact lenses of this type are complicated to produce, and furthermore the results obtained in terms of ability to correct visual defects are not always satisfactory.

Consequently, there is still a need in the relevant technical field to produce a contact lens capable of allowing both effective long-distance vision, particularly in the presence of ametropic defects such as hypermetropia and myopia, possibly combined with astigmatism, and effective short-distance vision, particularly in the presence of defects arising from loss of accommodation in the crystalline lens of the eye, such as presbyopia.

US 2010/0265458 discloses a contact lens, specifically designed for the treatment of diplopia, in which a central region is rendered optically inactive by darkening or by significantly increasing the dioptric power, so as to create a scotoma that essentially occludes the entire region of the fovea of one of the two eyes. In order to achieve this aim, US 2010/0265458 states that the optically inactive region must have a diameter of between 1 mm and 6 mm.

Indeed, this lens produces a substantial shadow cone on the retina that is perceptible to the user, so that if this lens were used on both eyes, the user's vision would be compromised.

DESCRIPTION OF THE INVENTION

The problem addressed by the present invention is that of providing a contact lens that is structurally and functionally designed to overcome the limitations described above with reference to the cited prior art.

In the context of this problem, one of the aims of the invention is to provide a contact lens that is simple to manufacture and therefore allows production costs to be contained.

Another aim of the invention is to provide a contact lens that allows effective vision even in the presence of a wide range of visual defects, without producing shadow zones that are significantly perceptible to the user.

The present invention solves this problem and achieves these aims by means of a contact lens produced in accordance with the claims that follow.

It should be noted that in the present description and in the claims attached hereto, a region of the contact lens is defined as "optically inactive" when it is shaped in such a way that the light which passes through it cannot be used for forming images that are distinguishable by the eye of the user.

In a first aspect, the present invention relates to a contact lens comprising:

an optical zone extending with a first diameter about an optical axis of said lens and provided with a first dioptric power, and a central region, inside and contiguous with the optical zone, extending about said optical axis with a second diameter smaller than said first diameter, inside which is provided an optically inactive region, extending about said optical axis with a third diameter smaller than approximately 0.5 mm.

In addition, in a second aspect, the invention relates to a method for the production of a contact lens, comprising the steps of providing an optical zone extending with a first diameter about an optical axis of said lens, with a first dioptric power, identifying a central region of said contact lens, inside and contiguous with the optical zone and extending about said optical axis with a second diameter smaller than said first diameter, and providing inside said central region an optically inactive zone extending about said optical axis with a third diameter smaller than approximately 0.5 mm.

Thanks to the above characteristics, a contact lens is obtained that provides significantly improved performance compared with the contact lenses described with reference to the prior art.

Surprisingly, it has been found that the introduction of a substantial optical alteration in a zone of the contact lens about the optical axis, such as to make said zone essentially unusable for the formation of images, where said zone has a suitably limited diameter with respect to the optical zone intended for overall vision, produces an unexpected increase in the visual performance of a user wearing the lens, without causing any perceptible shadow zone in his/her field of vision.

In particular, it has been found that this produces a significant increase in depth of field, giving the user improved vision even in the presence of different and combined visual defects, as described in greater detail below.

Without binding the validity of the solution forming the subject of the present invention to theoretical explanations, it is believed that said increase in depth of field may derive from the fact that images are formed on the retina only by the light passing through the portion of lens outside the optically inactive zone, with a consequent reduction of the circle of confusion, since the light passing through the optically inactive zone, which surrounds the optical axis over a limited diameter, does not contribute to the formation of any distinguishable image.

In a first embodiment, the optically inactive central region may be shaped so as to irregularly disperse the light that passes through it (a phenomenon known as scattering), thus preventing the light that passes through it from forming any image.

This effect may be obtained by forming on the surface of the optically inactive zone a plurality of microgrooves (or scratches) packed closely together and preferably running in variable directions, which render it opalescent. Preferably, the optically inactive zone has a degree of transparency greater than 10%.

In a second and preferred embodiment, the optically inactive zone is provided with a second dioptric power that differs from the first dioptric power by at least 6 dioptres, preferably at least 8 dioptres.

It should be noted that the calculation of the difference between the dioptric power of the optical zone and the dioptric power of the optically inactive zone must also take into account the negative or positive sign of the dioptric power, so that in a lens with a dioptric power of −3 in the optical zone, an optically inactive zone must be provided with a dioptric power equal to or less than −11 dioptres or equal to or greater than +5 dioptres.

This embodiment allows the contact lens to be produced with relatively simple and inexpensive manufacturing steps.

In particular, with respect to the previous embodiment, this embodiment avoids additional and non-standard manufacturing steps with respect to the procedures for the production of traditional contact lenses, due to the surface treatment of the optically inactive zone.

In a preferred embodiment of the invention, the central region has a progressive asphericality, so as to join in a continuous manner the second dioptric power of the optically inactive zone with the first dioptric power of the optical zone.

This characteristic makes it possible to avoid any abrupt discontinuity on the surface of the lens which, with such large differences of dioptric power, would lead to the formation of a "step", which could cause unwanted reflections or could otherwise interfere with correct vision.

Preferably, the asphericality of the central region varies in a linear manner.

In addition, preferably, both the central region and the optically inactive zone have a dioptric power that varies in a linear progression along the radial extension of the lens, from the optical axis to the first dioptric power at the border between the central region and the optical zone.

In this case, the second dioptric power has its maximum difference from the first dioptric power at the optical axis, where, in a most preferred embodiment, it amounts to 10 dioptres.

The central region preferably has a diameter of between 0.8 mm and 1.6 mm, and most preferably a diameter of approximately 1.2 mm.

The optically inactive zone preferably has a diameter of between 0.16 mm and 0.32 mm, and most preferably of approximately 0.24 mm.

With contact lenses having a linear progression of dioptric power in the central region and in the optically inactive zone, it has been found that with central regions having a diameter of less than 0.8 mm, the increased depth of field is virtually imperceptible to the user, while with a diameter greater than 1.6 mm, it has been found that a not negligible number of users reports imprecise vision, probably due to a shadow zone created on the retina by the optically inactive zone, which begins to be perceived by the user.

In a preferred embodiment, the contact lens is a soft contact lens.

Soft contact lenses comprise a hydrophilic polymeric matrix containing a uniform dispersion of a high fraction of water-based liquid component. This fraction is greater than 25% and can be as high as 75%.

Preferably, the contact lens is made from a polymeric hydrogel, for example based on HEMA (hydroxyethylmethacrylate) or silicone or on other materials known and commonly used in the field.

The liquid component may be an aqueous solution of sodium chloride at 0.9% by weight (physiological solution), or, preferably, a physiological solution supplemented with polymers suitable for conferring chemical-physical, rheological and biocompatibility characteristics capable of reproducing, as far as possible, the properties of the natural tear fluid. The latter type of liquid component is known as a "lachrymal substitute", and the polymer added is preferably chosen between hyaluronic acid (or its salts) or a galactoxyloglucan extracted from tamarind seeds (TSP), having suitable molecular weights, for example 600-800 KDalton.

Examples of soft contact lenses having a liquid component of the type indicated above are described in EP 1861069.

Preferably, the soft contact lens is a lens for monthly, weekly or daily replacement. In an alternative embodiment, the contact lens is a rigid or semi-rigid contact lens. In a preferred embodiment, the optical zone extends about the optical axis of the lens in such a way as to cover the entire area of the contact lens intended to cover the pupil of the user. Preferably, the optical zone has a diameter of at least 8 mm, for example between 10 mm and 12 mm, extending to a distance of approximately 1 mm-2 mm from the peripheral edge of the contact lens, which generally has a total diameter of between 13 mm and 16 mm.

In a preferred embodiment, the optical zone of the contact lens is shaped in such a way as to have a dioptric power designed to correct an ametropia.

In particular, the optical zone may have a dioptric power suitable for the correction of an ametropia of the spherical type, such as myopia or hypermetropia, or an ametropia of the non-spherical type, such as astigmatism, or a combination thereof.

Thanks to the increased depth of field obtained by introducing a hypercorrection in the optically inactive zone of the contact lens in accordance with the present invention, it is possible to form the optical zone with a dioptric power corresponding to a focal equivalent that is intermediate between different values of nominal dioptric power.

In a first embodiment example, the dioptric power of the optical zone is calculated as the mean of a nominal dioptric power calculated for the correction of a spherical ametropia, such as myopia or hypermetropia, and a second nominal dioptric power calculated for the correction of astigmatism.

In this case, the increase in depth of field is exploited in order to obtain better long-distance vision, maintaining a spherical contact lens.

Advantageously, the contact lens of the invention can therefore be used for an effective correction of myopia (or hypermetropia) combined with astigmatism, without having to resort to toric contact lenses.

In another embodiment example, the dioptric power of the optical zone is calculated as the mean of a nominal dioptric power calculated for the correction of an ametropia for long-distance vision, such as myopia or hypermetropia, and a nominal dioptric power calculated for the correction of presbyopia for short-distance vision.

Ametropia for long-distance vision may result from myopia or hypermetropia, possibly combined with astigmatism.

In this case, the increase in depth of field is exploited in order to obtain both better long-distance and better short-distance vision.

Advantageously, the contact lens of the invention can therefore be used for effective correction of ametropia (myopia or hypermetropia, possibly combined with astigmatism) and of presbyopia.

As a particular case of the embodiment example described above, it is envisaged that the dioptric power required for long-distance vision is zero, so that the dioptric power of the optical zone is calculated only on the basis of the required correction for short-distance vision, with a lower value (for example, half) with respect to the nominal correction required by the presbyopia of the user.

In this case, the contact lens is used for the correction of presbyopia.

In another embodiment, the optical zone is further designed to correct spherical aberration.

BRIEF DESCRIPTION OF THE DRAWINGS

The characteristics and advantages of the invention will be made clearer by the following detailed description of a preferred embodiment, given by way of non-limiting example, with reference to the accompanying drawings, in which.

PREFERRED EMBODIMENT OF THE INVENTION

Figure 1:
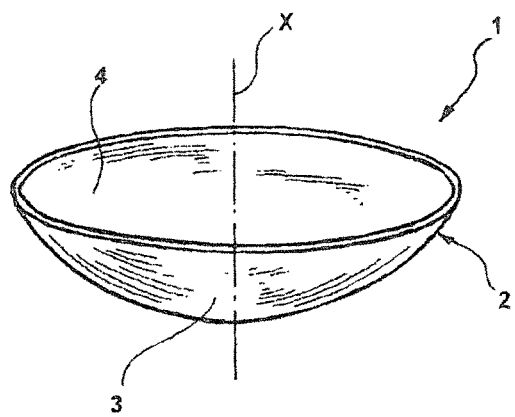
FIG. 1 is a perspective view of a contact lens produced according to the present invention.
Figure 2:
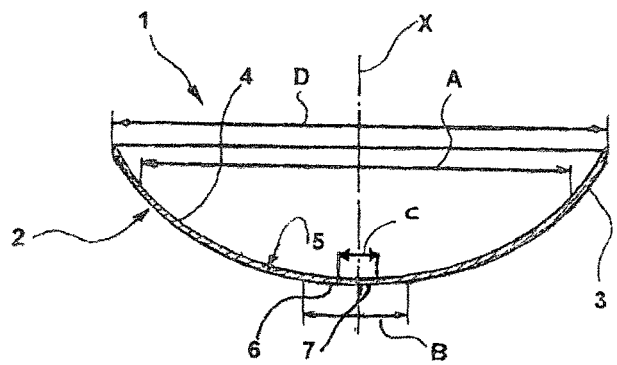
FIG. 2 is an axial cross-section view of the contact lens of FIG. 1.

In the drawings, the numeral 1 indicates the whole of a contact lens produced according to the present invention.

The lens 1 is preferably a soft contact lens made from a HEMA-based hydrogel, with a liquid component consisting of a lachrymal substitute formed by a physiological solution suitably supplemented with sodium hyaluronate and/or TSP.

The lens 1 comprises a body 2 in which are defined two surfaces 3 and 4, opposite each other, respectively convex and concave, making the lens 1 suitable to be applied on to the eye of a user.

The surfaces 3 and 4 are suitably shaped to refract the light that passes through them according to a predefined dioptric power, generically variable from one point of the lens to another, as described below in greater detail.

The contact lens 1 has an essentially circular shape in plan view, extending about an optical axis X of the lens, and has a diameter D of approximately 14 mm, making it suitable to be applied on to the eye of a user.

On the contact lens 1 are defined an optical zone 5, extending with a first diameter A about the optical axis X, and a central region 6, extending about the optical axis X with a second diameter B, smaller than the first diameter A, inside which is further defined an optically inactive zone 7, extending about the optical axis X with a third diameter C, smaller than the second diameter B.

The first diameter A of the optical zone 5 is approximately 11 mm, while the second diameter B of the central region B is approximately 1.2 mm and the third diameter C is approximately 0.5 mm.

The optical zone 5 is provided with a first dioptric power, while the optically inactive area 7 is provided with a second dioptric power that differs from the first dioptric power by at least 6 dioptres.

In the preferred embodiment described here, the entire central region 6 and the optically inactive zone 7 are provided with a dioptric power that varies in a linear manner according to the distance from the optical axis X between a minimum value, equal to the first dioptric power at the border between the optical zone 5 and the central region 6, and a maximum value at the optical axis X.

The maximum value of the second dioptric power, at the optical axis X, differs from the first dioptric power by 10 dioptres.

In the embodiment example described and illustrated here, the optical zone 5 is designed to correct a myopia of −3.50 dioptres in a person approximately 55 years of age with a degree of presbyopia of +2.00 dioptres.

In this case, the focal equivalent, calculated as the mean of the first nominal dioptric power of −3.50, relating to correction of the myopia, and the second nominal dioptric power of +2.00, relating to correction of the presbyopia, is −2.50 dioptres.

The first dioptric power of the optical zone corresponds to the focal equivalent of −2.50 dioptres calculated above.

The optically inactive zone 7 therefore has a second dioptric power of −12.50 dioptres at the optical axis X. Alternatively, the optically inactive zone 7 could have a second dioptric power of +7.50 dioptres at the optical axis X.

Figure 3:
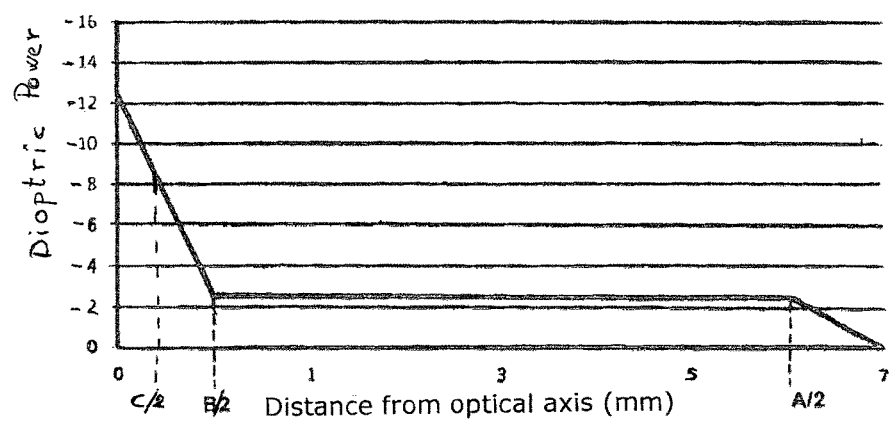
FIG. 3 is a graph illustrating the progressive variation in the dioptric power of the contact lens of FIG. 1 as a function of the distance from the optical axis.

FIG. 3 illustrates the progressive variation in the dioptric power of the lens 1 as the distance from the optical axis X changes. From this it will be seen that the dioptric power in the optically inactive zone 7 and the central region 6 varies in a linear manner from the maximum at the optical axis X to the minimum value equal to the first dioptric power with which it is connected to the optical zone 5.

The lens 1 allows both good short-distance vision and good long-distance vision.

In a second embodiment example, not illustrated in the attached drawings, the optical zone of the contact lens is designed to correct a myopia of −3.50 dioptres combined with an astigmatism of −1.50 dioptres along one of the two axes.

In this case, the focal equivalent, calculated as the mean of the first nominal dioptric power of −3.50, relating to correction of the myopia, and the second nominal dioptric power of −1.50, relating to correction of the astigmatism, is −4.25 dioptres.

The optical zone has a first dioptric power corresponding to the focal equivalent of −4.25 calculated above.

The optically inactive zone therefore has a second dioptric power of −14.25 (or +5.75) dioptres at the optical axis.

In this case, thanks to the increased depth of field, the contact lens allows improved long-distance vision.

In other embodiments of the invention, the optical zone of the contact lens is designed to correct hypermetropia, possibly combined with astigmatism, or myopia and hypermetropia, possibly combined with astigmatism, in the presence of presbyopia.

The present invention therefore solves the problem described above with reference to the prior art, while simultaneously offering numerous other advantages, including the ability to satisfy, with a single lens, differing needs in terms of the correction of visual defects. It will be appreciated that the contact lens described in detail above, having a first dioptric power of −2.50, allows the correction of different pairs of nominal dioptric powers deriving from myopia and presbyopia or from myopia and astigmatism. For example, the same focal equivalent of −2.50 arises from a myopia of −3.00 combined with a presbyopia of +1.00, or from a myopia of −3.75 and a presbyopia of +2.50, or from a myopia of −3.00 combined with an astigmatism of +1.00.

The invention therefore allows a substantial reduction in the number of possible combinations of the optical characteristics of the lenses, with obvious immediate advantages in terms of production and stock maintenance.

Naturally, a person skilled in the art will be able to create further modifications and variants in order to satisfy specific and contingent application needs, and any such variants and modifications remain within the scope of protection defined by the claims that follows.

The invention claimed is:

1. A contact lens (1) comprising:
   an optical zone (5) extending with a first diameter (A) about an optical axis (X) of said lens and provided with a first dioptric power, and
   a central region (6), inside and contiguous with said optical zone (5), extending about said optical axis with a second diameter (B) smaller than said first diameter, wherein an optically inactive zone (7) is provided inside said central region (6) extending about said optical axis with a third diameter (C) smaller than approximately 0.5 mm, said optically inactive zone (7) is shaped so as to have a second dioptric power that differs from said first dioptric power, said central region (6) is shaped so as to have a progressive asphericality that joins in a continuous manner said second dioptric power of said optically inactive zone (7) with said first dioptric power of said optical zone (5) such that light passing through the optically inactive zone (7) cannot be used for forming images that are distinguishable by an eye of a user.

2. The contact lens according to claim 1, wherein said second dioptric power differs from said first dioptric power by at least 6-8 diopters.

3. The contact lens according to claim 1, wherein said central region (6) and said optically inactive zone (7) have a dioptric power that varies in a linear manner from said optical axis (X) to said first dioptric power at said optical zone (5).

4. The contact lens according to claim 3, wherein, at said optical axis (X), said second dioptric power differs from said first dioptric power by 10 diopters.

5. The contact lens according to claim 1, wherein said second diameter (B) is between 0.8 mm and 1.6 mm.

6. The contact lens according to claim 1, wherein said third diameter (C) is between 0.16 mm and 0.32 mm.

7. The contact lens according to claim 1, wherein said first dioptric power of said optical zone is designed to correct an ametropia.

8. The contact lens according to claim 1, for correcting presbyopia.

9. The contact lens according to claim 1, for correcting an ametropia.

10. A method for the production of a contact lens, comprising the steps of:
    providing an optical zone (5) extending with a first diameter (A) about an optical axis of said lens, with a first dioptric power, and
    identifying a central region (6) of said contact lens, inside and contiguous with said optical zone and extending about said optical axis with a second diameter (B) smaller than said first diameter,
    providing an optically inactive zone (7) inside said central region (6) and extending about said optical axis with a third diameter (C) less than approximately 0.5 mm,
    shaping said optically inactive zone (7) so as to have a second dioptric power that differs from said first dioptric power, and
    shaping said central region (6) so as to have a progressive asphericality that joins in a continuous manner said second dioptric power of said optically inactive zone (7) with said first dioptric power of said optical zone (5) such that light passing through the optically inactive zone (7) cannot be used for forming images that are distinguishable by an eye of a user.

11. The method according to claim 10, wherein said second dioptric power differs from said first dioptric power by at least 6-8 diopters.

12. The method according to claim 10, wherein said central region (6) and said optically inactive zone (7) are shaped so as to have a dioptric power that varies in a linear progression from said optical axis (X) to said first dioptric power at said optical zone (5).

13. The method according to claim 12, wherein, at said optical axis (X), said second dioptric power differs from said first dioptric power by 10 diopters.

14. The method according to claim 10, wherein said second diameter (B) is between 0.8 mm and 1.6 mm.

15. The method according to claim 10, wherein said third diameter (C) is between 0.16 mm and 0.32 mm.

16. The method according to claim 10, wherein said first dioptric power corresponds to a focal equivalent calculated as the mean of:
    a first nominal dioptric power calculated for the correction of a spherical ametropia, and
    a second nominal dioptric power calculated for the correction of astigmatism.

17. The method according to claim 10, wherein said first dioptric power corresponds to a focal equivalent calculated as the mean of:
    a first nominal dioptric power calculated for the correction of an ametropia for long-distance vision, and
    a second nominal dioptric power calculated for the correction of presbyopia for short-distance vision.

* * * * *